United States Patent [19]

Barry

[11] Patent Number: 5,102,431
[45] Date of Patent: Apr. 7, 1992

[54] SMOG AND PARTICULATE COLLECTION SYSTEM FOR USE ON VEHICLES WITH INTERNAL COMBUSTION ENGINES

[76] Inventor: William R. Barry, 17101 Index St., Granada Hills, Calif. 91344

[21] Appl. No.: 735,576

[22] Filed: Jul. 25, 1991

Related U.S. Application Data

[63] Continuation-in-part of Ser. No. 577,788, Sep. 5, 1990, abandoned.

[51] Int. Cl.$^5$ ............................................. B61D 45/12
[52] U.S. Cl. ........................................ 55/1; 55/337; 55/399; 55/459.1; 55/DIG. 30
[58] Field of Search ............... 55/337, 399, 459.1, 55/454.3, 467, DIG. 30, 345, 1, 52

[56] References Cited

U.S. PATENT DOCUMENTS

| | | | |
|---|---|---|---|
| 3,535,854 | 10/1970 | Taylor | 55/399 X |
| 3,675,401 | 7/1972 | Cordes | 55/459.1 X |
| 4,019,883 | 4/1977 | Klomp | 55/DIG. 30 X |
| 4,184,858 | 1/1980 | Walker | 55/DIG. 30 X |
| 4,559,068 | 12/1985 | Lagerstedt et al. | 55/399 |
| 4,600,410 | 7/1986 | Baillie et al. | 55/399 X |
| 4,957,520 | 9/1990 | Parmentier et al. | 55/337 X |

*Primary Examiner*—Charles Hart
*Attorney, Agent, or Firm*—Thomas N. Giaccherini

[57] ABSTRACT

A Smog and Particulate Collection System for Use on Vehicles with Internal Combustion Engines is disclosed. The present invention not only removes pollutants from the exhaust gases of diesel trucks, but also collects and stores the carbon black byproduct produced by the burning of diesel fuel so that the carbon can be recycled. The preferred embodiment of the invention (10) is mounted on a truck cab (11). The exhaust manifold of the truck (13) is attached to an air intake (12) and transports exhaust gases (14) mixed with particulates (16) to an air cyclone accelerator (23). After the exhaust gases (14) and particulates (16) are accelerated, they are fed into a spiral vortex separation column (21), where fine dust particles of carbon black (28) are removed from the exhaust gases (14). The column (21) includes a metal housing (22) that surrounds an outer vortex chamber (24) and an interior exhaust tube (30) and terminates in a constricted portion (25). The separated particulates (28) are conveyed from the column (21) to a carbon storage tank (29). Clean air is expelled from the column (21) through an exhaust port (34). In the preferred embodiment, the valuable carbon black (28) which has been collected by the invention is recycled by removing the carbon (28) from the storage tank (29) when the operator of the truck (11) stops to refill his fuel tank (40) with diesel fuel (42). The carbon payload is then returned to the refinery that produced the diesel fuel using the same tank truck that delivered the diesel fuel (42).

11 Claims, 2 Drawing Sheets

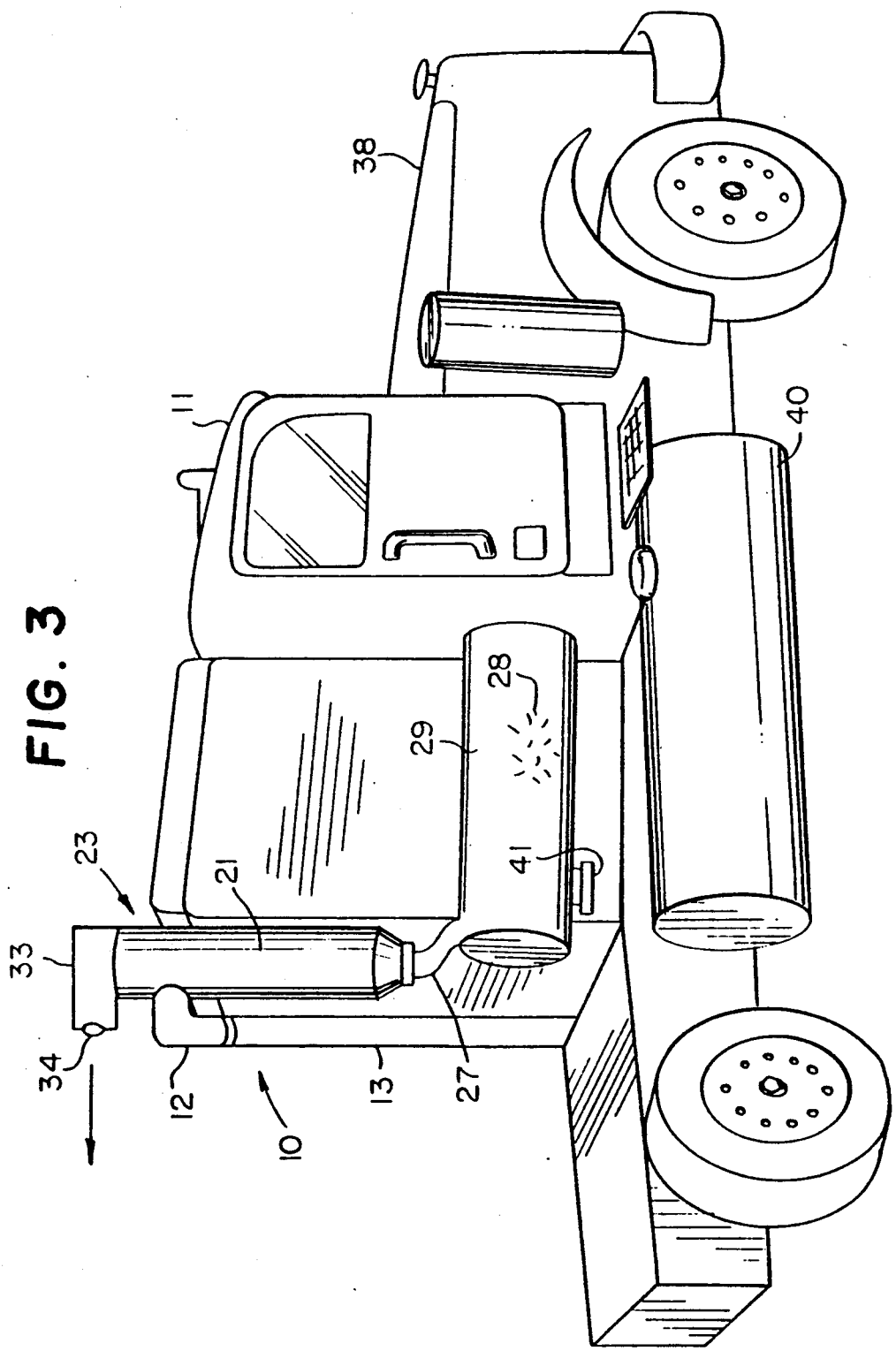

SMOG AND PARTICULATE COLLECTION SYSTEM FOR USE ON VEHICLES WITH INTERNAL COMBUSTION ENGINES

CROSS-REFERENCE TO A RELATED PATENT APPLICATION

The present patent application is a continuation-in-part application based on a pending parent application entitled Smog & Particulate Collection System, U.S. Ser. No. 07/577,788, now abandoned, filed on Sept. 5, 1990. The Applicant hereby claims the benefit of priority for the present patent application based upon the parent filed on Sept. 5, 1990 under the provisions of 35 USC Section 120.

BACKGROUND OF THE INVENTION

The present invention includes apparatus and methods for removing pollutants, contaminants, and particulates from the exhaust port of a vehicle powered by an internal combustion engine. More particularly, a preferred embodiment of the present invention is a pollution abatement system that is designed to collect smog from the exhaust system of a diesel truck and to store and recycle the carbon black collected by the system.

Each year combustion and other industrial sources emit millions of pounds of pollution into the environment. A substantial portion of the pollution discharged into our atmosphere comprises suspended particles called particulates. These contaminants are not chemically bound to the air, but are floating free in the atmosphere. Several attempts to solve this problem, including passive filter systems and active scrubbers, have met with disparate levels of success. None of the conventional systems provides an inexpensive yet effective system for removing particulates from the air. In addition to the detrimental effects of releasing millions of pounds of harmful particulates into the environment, these airborne effluents also constitute a needlessly wasted resource. A large portion of the solid emissions from diesel trucks are carbon particulates, which could be captured and recycled.

Several previous inventions have been employed to collect dust from air streams. John Taylor describes a Centrifugal Dust Separator in his U.S. Pat. No. 3,535,854. Taylor's separator differs from the present invention because Taylor does not disclose, teach, or even suggest the use of his device in combination with the exhaust of an internal combustion engine mounted on a vehicle. Even if Taylor did suggest such a combination, his apparatus relies on centrifugal separation, unlike the present invention, which utilizes an air cyclone accelerator to remove particulates from exhaust gases. Taylor also requires the use of a high speed coaxial impeller to drive his device, which is completely unnecessary in the Barry invention.

Parmentier discloses an Apparatus for the Removal of Vapors and Vapor Products in their U.S. Pat. No. 4,957,520. This device is totally dissimilar to the Barry Smog and Particulate Collection System. Parmentier's invention is intended for use as a vapor condensing hood which is placed over appliances that are employed to cook food products. An external refrigeration system continuously cools a cooking steam exhaust which is forced over cooled walls by an extraction turbine fan. Parmentier is clearly not designed to be coupled to the exhaust of a diesel truck engine.

U.S. Pat. No. 3,675,401, issued to Cordes, reveals Cyclones to Lessen Fouling. This patent describes an invention which is entirely unrelated to motor vehicles. The narrow design focus of this implement is the prevention of cyclone fouling during the industrial process of fluidized iron ore reduction. Cordes' system is specifically built to process sticky chemicals and solids that tend to cohere together. The primary inventive aspects of this machine concern an optimized barrel length for the cyclone and the use of a rotating shaft which terminates in upper and lower fin sections.

Edward Klomp explains his Vortex Sulfuric Acid Separator in U.S. Pat. No. 4,019,883. Although Klomp does indicate that his invention could be connected to an automobile, his invention does not pertain to the removal of particulates from exhaust gases. This patent involves cooling a stream of gas to condense and remove sulfuric acid. Unlike the Barry Smog & Particulate Collection System, Klomp does not employ an air cyclone accelerator.

U.S. Pat. No. 4,184,858 by Walker teaches the construction of an Engine Emission Control Device. Walker, like Klomp, suggests the use of his invention with an automobile engine, but Walker's system requires a complex arrangement of polyurethane foam filtering material that is flushed with hot lubricating oil that is pumped from the engine crankcase.

Lagerstedt et al. disclose an Arrangement for the Separation of Particles in their U.S. Pat. No. 4,559,068. This patent employs a helical guiding element and radially-notched collar having drop forming elements and tongues that remove water and sterilizing agents like hydrogen peroxide from an air stream. Lagerstedt's apparatus is designed for use with packing machines that manufacture aseptic non-returnable packages for heat-treated, liquid foodstuffs such as milk. This invention does not pertain to internal combustion engines.

A Process and Apparatus for Separation Particulate Matter from a Gaseous Medium is described by Baillie et al. in U.S. Pat. No. 4,600,410. This patent describes composite conical-cylindrical walls which define a swirl-inducing zone for separating contaminants from a gaseous medium. Baillie does not disclose an air cyclone accelerator, nor does he suggest the use of his invention with an internal combustion engine.

None of the earlier patented devices described above are designed to collect particulates so they can be recycled. The essence of the present invention is to both remove particulates from exhaust gases emitted from internal combustion vehicles, while also providing a simple and cost-effective system for reusing the carbon-black which is collected during the cleaning process.

The shortcomings of previous air cleaning devices has presented a major challenge to engineers and scientists in the transportation industry. The development of a highly reliable yet effective system that purifies motor vehicle exhaust fumes would constitute a major technological advance. The enhanced performance that could be achieved using such an innovative device would satisfy a long felt need within the motor vehicle business.

SUMMARY OF THE INVENTION

The Barry Smog and Particulate Collection System overcomes the problems encountered by previous air treatment devices. The present invention not only removes pollutants from exhaust gases emitted by vehicles powered by internal combustion engines, but also provides for the storage and recycling of the carbon black byproduct, which is itself a valuable industrial commodity.

The preferred embodiment of the invention is mounted on a diesel truck cab and includes an intake which is connected to an exhaust manifold. Exhaust gases containing particulates are first conveyed from the intake through an air cyclone accelerator, and then to a vortex spiral separation column, which removes the particulates from the exhaust gases. The narrowed lower end of the column is attached to a connector that transports separated particulates to a carbon black recycling tank, which is also mounted on the truck. The invention is pressurized by the flow of exhaust gases generated by the internal combustion engine, and does not require an external fan or turbine. Purified air is expelled from an exhaust vent located above the roof of the truck. The collected carbon black can be sold back to a fuel retailer, who, in turn, can recycle the combustion byproduct back to the refinery that manufactures the petroleum fuel.

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

FIG. 3 is a perspective view of the Smog and Particulate Collection System mounted on a conventional truck cab.

DETAILED DESCRIPTION OF A PREFERRED EMBODIMENT

Figure 1A:
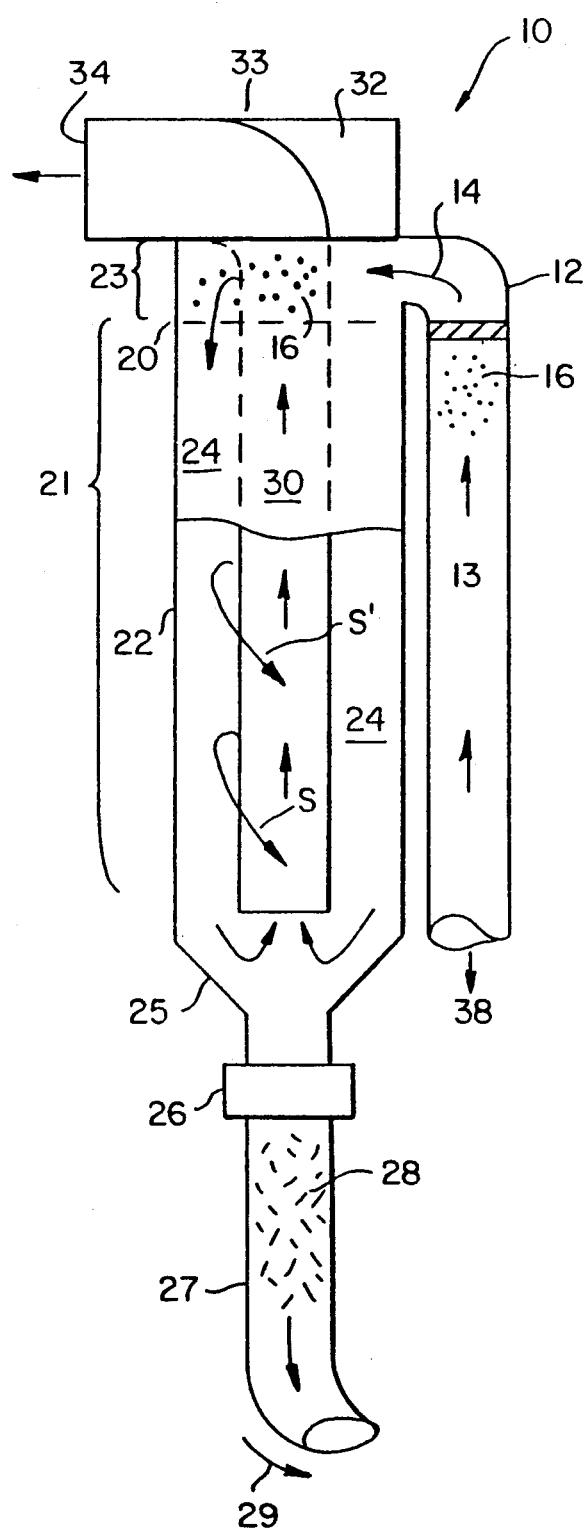
FIG. 1(a) is a schematic, partial cross-sectional side view of a preferred embodiment of the present invention.
Figure 1B:
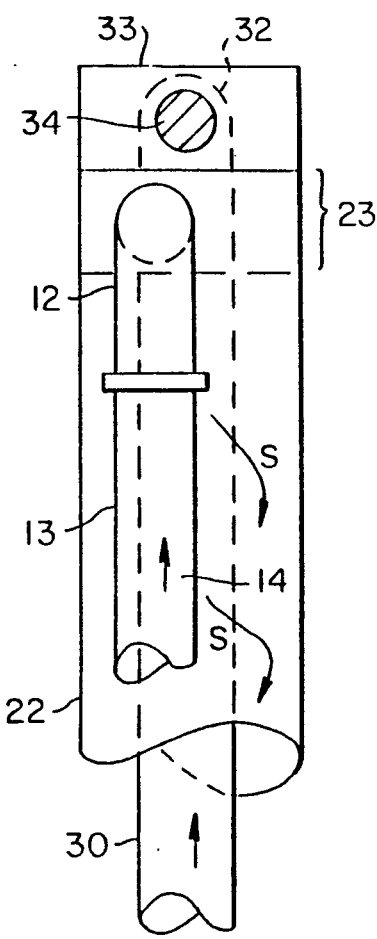
FIG. 1(b) is schematic, partial cross-sectional front view of the device pictured in FIG. 1(a).

FIGS. 1(a) and 1(b) depict the present invention in partial cross-sectional views. The preferred embodiment of the Smog and Particulate Collection System for Use on Vehicles with Internal Combustion Engines is mounted on a truck cab 11 and includes an exhaust gas intake 12 which is directly coupled to the truck's exhaust manifold 13. The exhaust manifold 13 delivers exhaust gases 14 containing particulates 16 to the intake 12, which conveys the gases 14 and particulates 16 to the top portion 20 of the spiral vortex separation column 21. The column 21 comprises a metal housing 22 that surrounds an outer vortex chamber 24 and terminates in a constricted portion 25. The narrowed end 25 of the housing 22 extends into a fitting 26 which is coupled to a connector 27 that transports separated particulates 28 to a carbon storage tank 29. An interior exhaust tube 30 extends down into the outer vortex chamber 24. Interior exhaust tube 30 is generally coaxial with and is enclosed by the housing 22. The end of the tube 30 which is opposite the connector 27 terminates in a top portion 32. Clean air is expelled from the top portion 32 of exhaust tube 30 through an exhaust port 34 formed in an exhaust housing 33.

Figure 2:
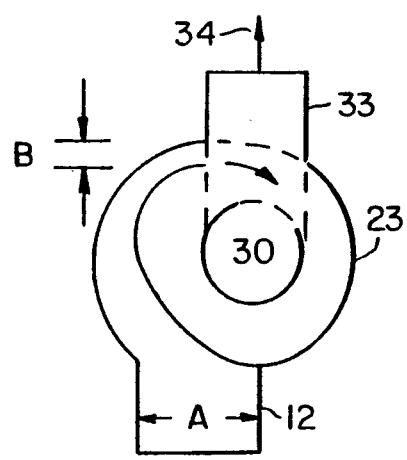
FIG. 2 is a top schematic view of an air cyclone accelerator.

FIG. 3 is a top view of the exhaust gas intake section 12 which is directly coupled to exhaust gas manifold 13. The top portion 20 of the column 21 functions as an air cyclone accelerator 23 which compresses the exhaust gases 14 entering the column. As exhaust gases travel into the intake section 12 toward and around the interior exhaust tube 30, the flow is constricted by the narrowed contours of the intake passageway. The cross-sectional area of the intake, denoted "A" in FIG. 2, is much larger than the narrowest part of the intake labeled "B". The gradually diminished cross-section of the intake section 12 is essentially a Venturi port that causes the air to speed up. The accelerated air creates a vortex spiral (shown by arrows marked "S") that travels down the separation column 21 into outer vortex chamber 24. Carbon, lead, and other smog particulates 28 fall out of the vortex spiral through fitting 26 connector 27 into a storage tank 29. Purified air is drawn up the interior exhaust chamber 30 and out of the column 21 via the top portion of the tube 32. The cleaned air is expelled through an exhaust port 34 formed in exhaust housing 33. The tank 29 is used to recycle collected particulates. In one embodiment of the invention, the tank 29 is a fixed metal cylinder mounted on truck 11. In an alternative embodiment, the tank 29 can comprise a lightweight, removable, modular canister. As an alternative, the tank 29 can be fabricated as a fixed metal cylinder which is permanently mounted on the side of truck 11. Such a fixed tank 29 could be emptied through a resealable capped port by an external vacuum device (not shown).

FIG. 4 presents a pictorial view of the Smog and Particulate Collection System 10 attached to a conventional diesel truck 11. Although the preferred embodiment of the invention is used in combination with an engine 38 that runs on diesel fuel, any fuel which is a derivative of petroleum may be employed. When the engine 38 is a four stroke machine, the pressure supplied by the engine obviates the need for an external compressor or fan. A typical diesel truck burns a fuel which is primarily composed of hydrocarbon compounds, although a small amount of other elements such as sulfur, lead, oxygen, and nitrogen may be present. When burned, crude oils generally produce a solid residue or output of carbon. This carbon usually accounts for over eighty percent of the weight of the solid waste products generated by the combustion process. The enormously beneficial aspect of the present invention is that this waste product, which normally is emitted into the environment and pollutes our air, can be easily recycled as a valuable industrial commodity. One gallon of liquid petroleum fuel weighs about eight pounds. The solid, fine-grained carbon black which the present invention can collect for each gallon of petroleum fuel that is burned by a diesel engine can weigh over six pounds. Carbon black is a highly useful product which is used in great quantities as cement coke and which is also employed to manufacture tires for cars and trucks. In one embodiment of the invention, a trucker who stops at a service station to refill his or her fuel tank could also simultaneously have the particulate storage tank 29 emptied. The collected carbon black 28 would be sold back to the fuel seller and credited toward the purchase of diesel fuel. With slight modifications, the service station could ship the carbon black back to the refinery using the same trucks that deliver diesel and gasoline fuels.

One embodiment of the exhaust gas intake 12 utilizes a cross-sectional area of 3 inches by 10 inches, or 0.208 square feet. A truck fitted with the present invention traveling at 45 miles per hour will gather approximately 44,478 cubic feet of air per hour, or about 444 million cubic feet of air for every 10,000 hours of operation. Two units 10 mounted in tandem would be capable of purifying nearly one billion cubic feet of air during this period. The drag effects on the truck are negligible.

Although the present invention has been described in detail with reference to a particular preferred embodiment, persons possessing ordinary skill in the art to which this invention pertains will appreciate that various modifications and enhancements may be made without departing from the spirit and scope of the claims that follow. The List of Reference Numerals which follows is intended to provide the reader with a convenient means of identifying elements of the invention in the specification and drawings. This list is not intended to delineate or narrow the scope of the claims.

LIST OF REFERENCE NUMERALS

FIGS. 1(a) and 1(b)

10—Smog and Particulate Collection System
11—Truck
12—Exhaust gases intake section
13—Truck exhaust manifold
14—Exhaust gases
16—Particulates
20—Top portion of column
21—Spiral vortex separation column
22—Housing
23—Air cyclone accelerator
24—Outer vortex chamber
25—Constricted portion of housing
26—Fitting
27—Connector
28—Collected particulates
29—Storage tank
30—Interior exhaust tube
32—Top portion of interior exhaust tube
33—Exhaust housing
34—Exhaust port

FIG. 2

A—Largest cross-sectional area of air intake
B—Narrowed Venturi cross-sectional area of air intake

FIG. 3

38—Engine
40—Fuel tank
41—Resealable capped port on particulate tank
42—Petroleum derivative fuel

What is claimed is:

1. An apparatus (10) for removing, collecting, storing, and recycling a particulate (16) from a volume of exhaust gas (14) emitted from an internal combustion engine (38); said internal combustion engine (38) having an exhaust manifold (13); said internal combustion engine (38) also being coupled to a fuel tank (40) containing a derivative of engine petroleum (42); said apparatus (10) comprising:

an exhaust gas intake (12) for gathering said volume of exhaust gas (14); said volume of exhaust gas (14) including said particulate (16); said exhaust gas intake (12) being coupled to said exhaust manifold (13);

a spiral vortex separation column (21) for substantially removing said particulate (16) from said volume of exhaust gas (14);

said spiral vortex separation column (21) being connected to said exhaust gas intake (12);
said spiral vortex separation column (21) having a particulate collection end (25);
said spiral vortex separation column (21) including
an outer vortex chamber (24);
an interior exhaust tube (30);
said outer vortex chamber (24) substantially enclosing said interior exhaust tube (30);
said outer vortex chamber (24) being aligned substantially coaxially with said interior exhaust tube (30); and
said outer vortex chamber (24) being capable of receiving said volume of exhaust gas (14) and said particulate (16) from said exhaust gas intake (12);
an air cyclone accelerator (23) for creating a vortex of air;
said air cyclone accelerator (23) being located between said exhaust gas intake (12) and said spiral vortex separation column (21);
said air cyclone accelerator (23) being pressurized by the force of said volume of exhaust gas (14) discharged by said internal combustion engine (38); and
said air cyclone accelerator (23) including an air intake cross-sectional area A and a narrowed Venturi cross-sectional area B; said air intake cross-sectional area A being substantially larger in cross-sectional area than said narrowed Venturi cross-sectional area B;
an exhaust housing (33) having an exhaust port (34) for emitting a volume of purified air; said exhaust port (34) being connected to said interior exhaust tube (30); and
a particulate collection tank (29) for recycling said particulate (16);
said particulate collection tank (29) being coupled to said spiral vortex separation column (21) at said particulate collection end (25); and
said particulate collection tank (29) being capable of holding a volume of particulate (16) equal to the volume of particulate produced by burning the contents of said fuel tank (40) when said fuel tank (40) is completely filled with said derivative of petroleum (42).

2. An apparatus as recited in claim 1, in which said spiral vortex separation column (21) has a length to diameter ratio of approximately three to one.

3. An apparatus as recited in claim 1, in which said air cyclone accelerator (23) has an air intake cross-sectional area A to a narrowed Venturi cross-sectional area B ratio of approximately eight to one.

4. An apparatus as recited in claim 1, in which said spiral vortex separation column (21) has a diameter which is approximately four times greater than the diameter of said particulate collection end (25).

5. An apparatus as recited in claim 1, in which said derivative of petroleum (42) is diesel fuel.

6. An apparatus as recited in claim 1, in which said internal combustion engine (38) is a four stroke engine.

7. An apparatus as recited in claim 1, in which said particulate collection tank (29) is a removable, modular canister.

8. An apparatus as recited in claim 1, in which said particulate collection tank (29) is capable of being emptied through a resealable capped port 41 by an external vacuum system.

9. An apparatus as recited in claim 1, in which said outer vortex chamber (24) has a diameter which is approximately twice as large as the diameter of said interior exhaust tube (30).

10. An apparatus as recited in claim 1, in which said interior exhaust tube (30) extends along nearly the entire length of said outer vortex chamber (24).

11. A method of treating exhaust gases (14) emitted from an internal combustion engine (38); said internal combustion engine (38) being coupled to a fuel tank (40) which is capable of holding a derivative of petroleum (42) and being mounted on a vehicle (11) comprising the steps of:

transporting said exhaust gases (14) from an exhaust gas manifold (13) coupled to said internal combustion engine (38) to an air intake (12);

accelerating said exhaust gases (14) by conveying said exhaust gases (14) from said air intake (12) to an air cyclone accelerator (23);

separating a particulate (16) from said exhaust gases (14) using a spiral vortex separation column (21) connected to said air cyclone accelerator (23);

collecting and storing said particulate (16) in a particulate storage tank (29) coupled to said spiral vortex separation column and mounted on said vehicle (11); and recycling said particulate (16) periodically by removing said particulate (16) from said particulate storage tank (29) when said fuel tank (40) needs refilling.

* * * * *